United States Patent
Harnisch et al.

(10) Patent No.: US 7,573,845 B2
(45) Date of Patent: Aug. 11, 2009

(54) COMMUNICATION PARTNER DEVICE FOR COMMUNICATION WITH ANOTHER COMMUNICATION PARTNER DEVICE OVER A FIRST COMMUNICATION CHANNEL

(75) Inventors: Markus Harnisch, Graz (AT); Stefan Posch, Graz (AT); Holger Kunkat, Graz (AT)

(73) Assignee: NXP B.V., Eindhoven (NL)

( * ) Notice: Subject to any disclaimer, the term of this patent is extended or adjusted under 35 U.S.C. 154(b) by 376 days.

(21) Appl. No.: 10/541,882

(22) PCT Filed: Dec. 22, 2003

(86) PCT No.: PCT/IB03/06253

§ 371 (c)(1), (2), (4) Date: Jul. 7, 2005

(87) PCT Pub. No.: WO2004/064339

PCT Pub. Date: Jul. 29, 2004

(65) Prior Publication Data

US 2006/0109824 A1 May 25, 2006

(30) Foreign Application Priority Data

Jan. 8, 2003 (EP) ................... 03100020

(51) Int. Cl.
*H04W 4/00* (2009.01)

(52) U.S. Cl. .................. 370/329; 370/328; 370/338; 370/352; 455/41.2; 455/552.1; 455/426.1; 455/517; 455/550.1

(58) Field of Classification Search ............... 359/172; 370/328–334, 338, 352; 380/270–273; 455/552.1, 455/553.1, 464, 410–411, 41.1–41.3, 517–519, 455/426.1, 445; 340/825.69
See application file for complete search history.

(56) References Cited

U.S. PATENT DOCUMENTS

| | | | | |
|---|---|---|---|---|
| 5,301,353 A | * | 4/1994 | Borras et al. | 455/9 |
| 5,404,572 A | * | 4/1995 | Ishii | 455/67.14 |
| 5,446,783 A | * | 8/1995 | May | 455/557 |
| 5,508,836 A | * | 4/1996 | DeCaro et al. | 398/202 |
| 5,585,953 A | * | 12/1996 | Zavrel | 398/115 |
| 5,608,723 A | * | 3/1997 | Felsenstein | 370/335 |
| 5,617,236 A | * | 4/1997 | Wang et al. | 398/117 |
| 5,796,772 A | * | 8/1998 | Smith et al. | 375/130 |
| 5,946,120 A | * | 8/1999 | Chen | 398/155 |
| 6,157,845 A | * | 12/2000 | Henry et al. | 455/426.1 |

(Continued)

*Primary Examiner*—Sharad Rampuria

(57) ABSTRACT

In a communication partner device (2A) which belongs to a communication system (1) having at least two such communication partner devices (2A, 2B) and which is designed for contactless communication over a first communication channel (4), wherein one of the two communication partner devices (2A, 2B) contains a communication enable information item (CEIA, CEIB) which is used to enable communication between the one communication partner device (2A) and the other communication partner device (2B) over the first communication channel (4), a communication stage (5A) is provided which is designed for contactless communication with a communication stage (5B) of the other communication partner device (2B) over a second communication channel (7) and which, in the event of communication over the second communication channel (7), is designed to make available the communication enable information item (CEIA, CEIB), necessary for communication over the first communication channel (4), in the communication partner device (2A, 2B) which prior to communication over the second communication channel (7) does not yet contain the communication enable information item (CEIA, CEIB).

26 Claims, 3 Drawing Sheets

U.S. PATENT DOCUMENTS

| | | | |
|---|---|---|---|
| 6,377,811 B1 * | 4/2002 | Sood et al. | 455/464 |
| 6,381,467 B1 * | 4/2002 | Hill et al. | 455/519 |
| 6,396,612 B1 * | 5/2002 | Bjorndahl | 398/121 |
| 6,694,150 B1 * | 2/2004 | Standke et al. | 455/552.1 |
| 6,865,401 B2 * | 3/2005 | Kotzin | 455/557 |
| 6,868,237 B2 * | 3/2005 | Willebrand et al. | 398/214 |
| 6,895,255 B1 * | 5/2005 | Bridgelall | 455/552.1 |
| 6,901,241 B2 * | 5/2005 | Bjorndahl | 455/41.2 |
| 6,912,374 B2 * | 6/2005 | Clough et al. | 455/41.2 |
| 7,116,938 B2 * | 10/2006 | Monroe et al. | 455/41.2 |
| 7,263,361 B2 * | 8/2007 | Taylor | 455/450 |
| 7,277,420 B2 * | 10/2007 | Chou et al. | 370/350 |
| 7,328,045 B2 * | 2/2008 | Funk et al. | 455/560 |
| 2002/0186846 A1 * | 12/2002 | Nyberg et al. | 380/273 |
| 2003/0007641 A1 * | 1/2003 | Kinoshita | 380/270 |
| 2004/0132408 A1 * | 7/2004 | Grego | 455/41.2 |
| 2005/0266876 A1 * | 12/2005 | Boesen | 455/552.1 |

* cited by examiner

COMMUNICATION PARTNER DEVICE FOR COMMUNICATION WITH ANOTHER COMMUNICATION PARTNER DEVICE OVER A FIRST COMMUNICATION CHANNEL

The invention relates to a communication partner device which belongs to a communication system having at least two such communication partner devices and which is designed to communicate with another communication partner device of the communication system over a first communication channel, wherein one of the two communication partner devices contains a communication enable information item which is used to enable communication between the one communication partner device and the other communication partner device over the first communication channel.

The invention further relates to a circuit for a communication partner device, which communication partner device belongs to a communication system having at least two such communication partner devices and is designed to communicate with another communication partner device of the communication system over a first communication channel, wherein one of the two communication partner devices contains a communication enable information item which is used to enable communication between the one communication partner device and the other communication partner device over the first communication channel.

The invention further relates to a communication enabling method for enabling communication over a first communication channel between a communication partner device which belongs to a communication system having at least two such communication partner devices, and another communication partner device of the communication system, wherein one of the two communication partner devices contains a communication enable information item and wherein the communication enable information item is used to enable communication between the one communication partner device and the other communication partner device over the first communication channel.

A communication partner device of the type mentioned in the first paragraph, which has a circuit of the type mentioned in the second paragraph and which can be used to carry out a communication enabling method of the type mentioned in the third paragraph, is commercially available, so that the communication partner device, the circuit and the communication enabling method are known.

The known communication partner device of the type mentioned in the first paragraph is a laptop which has what is known as a Bluetooth™ interface. Using the Bluetooth™ interface, it is possible to carry out contactless communication over a first communication channel, namely over a Bluetooth™ communication channel, with another communication partner device lying within a Bluetooth™ communication range of at most around 100 meters. The other communication partner device is a printer which in turn has a Bluetooth™ interface. A printing information item can be communicated from the laptop to the printer over the first communication channel, and can be printed by the printer onto a sheet of paper if, at the start of such communication, the laptop responds to the printer with a communication enable information item which is originally contained only in the printer, which communication enable information item has previously been provided to a software application, running on the laptop, for communication over the first communication channel. For this purpose, initially the laptop searches for an uptake of contact with the printer and, when the Bluetooth™-enabled printer is detected within the communication range of the laptop, a Bluetooth™ connection is set up to the printer over the Bluetooth™ communication channel, wherein the communication enable information item provided to enable communication with the printer is made available to the laptop over the Bluetooth™ communication channel. A software application running on the laptop can then use the communication enable information item to respond to the printer over the Bluetooth™ communication channel and to communicate the printing information item to the printer.

In the known communication partner device, that is to say the laptop, there is the problem that the making available of the communication enable information item over the first communication channel takes place in a slow and complicated manner. A further problem is that, if a number of other communication partner devices designed to communicate over the Bluetooth™ communication channel are within the communication range of the laptop, additional delays in the transmission and making available of the communication enable information item are practically unavoidable because initially all communication partner devices lying within a communication range are contacted in order to transmit, from each of the other communication partner devices, the communication enable information item contained in the latter, so that a user of the laptop can then make a manual selection, using the software application, as to which of the other communication partner devices the laptop should use as communication partner.

It is an object of the invention to overcome the above-described problems in a communication partner device of the type mentioned in the first paragraph, in a circuit of the type mentioned in the second paragraph and in a communication enabling method of the type mentioned in the third paragraph, and to provide an improved communication partner device, an improved circuit and an improved communication enabling method.

To achieve the abovementioned object, a communication partner device according to the invention is provided with features according to the invention, so that a communication partner device according to the invention can be characterized as follows, namely:

communication partner device which belongs to a communication system having at least two such communication partner devices and which is designed to communicate with another communication partner device of the communication system over a first communication channel, wherein one of the two communication partner devices contains a communication enable information item which is used to enable communication between the one communication partner device and the other communication partner device over the first communication channel, and which is designed to interact with an electrical circuit, which circuit has circuit parts for forming communication means which are designed for contactless communication with communication means of the other communication partner device over a second communication channel and which, in the event of communication over the second communication channel, are designed to make available the communication enable information item, necessary for enabling communication over the first communication channel, in the communication partner device which prior to communication over the second communication channel does not yet contain the communication enable information item.

To achieve the abovementioned object, a circuit according to the invention is provided with features according to the invention, so that a circuit according to the invention can be characterized as follows, namely:

circuit for a communication partner device, which communication partner device belongs to a communication system having at least two such communication partner devices and is designed to communicate with another communication partner device of the communication system over a first communication channel, wherein one of the two communication partner devices contains a communication enable information item which is used to enable communication between the one communication partner device and the other communication partner device over the first communication channel, which circuit has circuit parts for forming communication means which are designed for contactless communication with communication means of the other communication partner device over a second communication channel and which, in the event of communication over the second communication channel, are designed to make available the communication enable information item, necessary for enabling communication over the first communication channel, in the communication partner device which prior to communication over the second communication channel does not yet contain the communication enable information item.

To achieve the abovementioned object, a communication enabling method according to the invention is provided with features according to the invention, so that a communication enabling method according to the invention can be characterized as follows, namely:

communication enabling method for enabling communication over a first communication channel between a communication partner device which belongs to a communication system having at least two such communication partner devices, and another communication partner device of the communication system, wherein one of the two communication partner devices contains a communication enable information item and wherein the communication enable information item is used to enable communication between the one communication partner device and the other communication partner device over the first communication channel, and wherein contactless communication is effected over a second communication channel using communication means of the one communication partner device and using communication means of the other communication partner device and wherein, in the event of such communication over the second communication channel, the communication enable information item, necessary for enabling communication over the first communication channel, is made available in the communication partner device which prior to communication over the second communication channel does not yet contain the communication enable information item.

By providing the measures according to the invention, the advantage is obtained that the communication enable information item is made available in the one communication partner device or in the other communication partner device in as uncomplicated a manner as possible, even when there are a number of other communication devices, avoiding use of the first communication channel, in order to enable communication between the communication partner devices over the first communication channel without there being any need for lengthy attempts at connection setup beforehand with another communication partner device or without there being any need for additional manual actions by a user in order to make the communication enable information item available.

In the solutions according to the invention, it has also proven to be advantageous if the features as claimed in Claim 2 or Claim 12 or Claim 21 are additionally provided. As a result, the advantage is obtained that the communication enable information item is made available as quickly as possible.

In the solutions according to the invention, it may be provided, for example, that the communication enable information item is communicated relatively early with the aid of commands of a user protocol that are provided for this purpose, such as, for example, with the aid of a conventional useful data transmission command or with the aid of a conventional useful data reception command, wherein the communication enable information item in this case forms what is known as a useful data argument for the respective command. However, it has proven to be particularly advantageous if the features as claimed in Claim 3 or Claim 13 or Claim 22 are additionally provided. As a result, the advantage is obtained that the communication enable information item is made available practically immediately upon activation of the communication protocol, and precisely even before the useful data transmission command or the useful data reception command for communication in compliance with the communication protocol is available.

In the solutions according to the invention, it has also proven to be advantageous if the features as claimed in Claim 4 or Claim 14 or Claim 23 are additionally provided. As a result, the advantage is obtained that the communication enable information item received by the other communication partner device over the second communication channel is reliably provided or stored for subsequent use in the one communication partner device.

In the solutions according to the invention, it has also proven to be advantageous if the features as claimed in Claim 5 or Claim 24 are additionally provided. As a result, the advantage is obtained that, immediately after reception of the communication enable information item, the first communication channel is used for communication and, where appropriate, can be designated as occupied by such communication, so that the first communication channel is available exclusively for communication between the one communication partner device and the other communication partner device.

In the solutions according to the invention, it has also proven to be advantageous if the features as claimed in Claim 6 or Claim 15 or Claim 25 are additionally provided. As a result, the advantage is obtained that the one communication enable information item contained in the one communication partner device can be communicated independently of the first communication channel, with the aid of the communication means, over the second communication channel.

In the solutions according to the invention, it has also proven to be advantageous if the features as claimed in Claim 7 or Claim 16 or Claim 23 are additionally provided. As a result, the advantage is obtained that the communication enable information item can be used to select an interface in the communication partner device that is suitable for communication over the first communication channel.

In the solutions according to the invention, it has also proven to be advantageous if the features as claimed in Claim 8 or Claim 17 or Claim 25 are additionally provided. As a result, the advantage is obtained that the communication enable information item can be used to select a preferred interface, from a multiplicity of suitable interfaces, for communication over the first communication channel.

In the solutions according to the invention, it has also proven to be advantageous if the features as claimed in Claim 9 or Claim 18 or Claim 26 are additionally provided. As a result, the advantage is obtained that the interface designated by the interface designation information item can be responded to unambiguously in the event of communication over the first communication channel and, even when there are a number of similar interfaces, confusion between the interface actually desired for communication over the first communication channel and another similar interface is reliably avoided.

In the solutions according to the invention, it has also proven to be advantageous if the features as claimed in Claim 10 or Claim 19 or Claim 26 are additionally provided. As a result, the advantage is obtained that an unambiguous identification or an unambiguous addressing or selecting of the respectively desired communication partner device is ensured in the event of communication over the first communication channel.

The above-described aspects and further aspects of the invention emerge from the example of an embodiment described below, and are explained on the basis of said example of an embodiment.

The invention will be further described with reference to an example of an embodiment shown in the drawings to which, however, the invention is not restricted.

Figure 1:
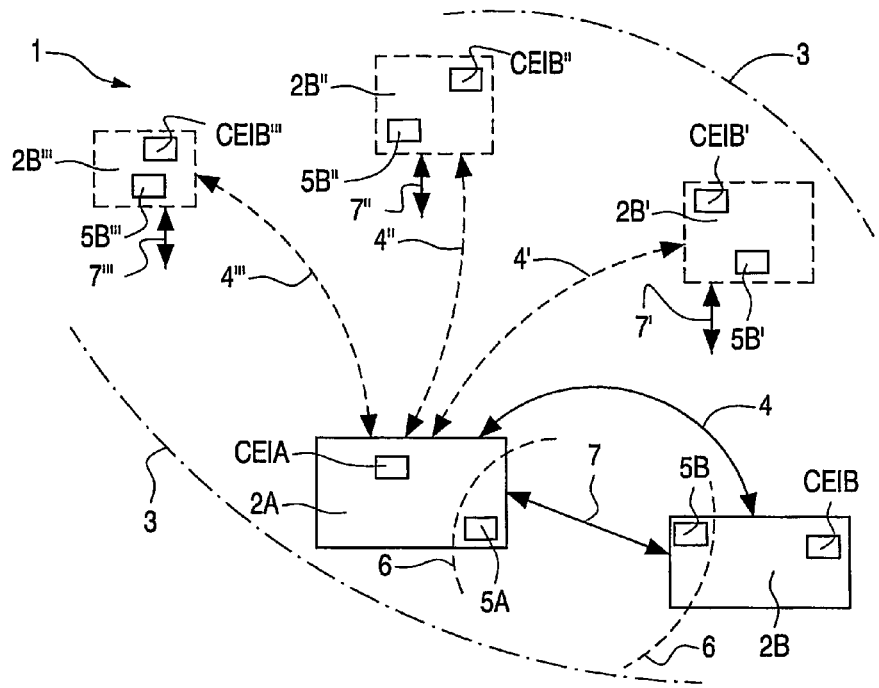
FIG. 1 shows schematically, in the form of a block diagram, a first communication partner device and a second communication partner device in accordance with an example of an embodiment of the invention, which form a communication system.

FIG. 1 shows a communication system 1 which has a first communication partner device 2A and a second communication partner device 2B. The two communication partner devices 2A and 2B are arranged within a first communication range 3. The first communication range 3 is indicated by a pictorial representation of its outline with the aid of dash-dotted lines. Each communication partner device 2A or 2B is designed for contactless communication with the other communication partner device 2B or 2A, respectively, over a first communication channel 4 that is indicated by a curved double arrow. The first communication partner device 2A contains a first communication enable information item CEIA and the second communication partner device 2B contains a second communication enable information item CEIB, wherein the two communication enable information items CEIA and CEIB are used to enable communication, which is in this case contactless, between the one communication partner device 2A and the other communication partner device 2B over the first communication channel 4.

The two communication partner devices 2A and 2B are furthermore designed for contactless communication over a second communication channel 7 that is indicated by a straight double arrow, wherein, in the event of communication over the second communication channel 7, the two communication enable information items CEIA and CEIB can be exchanged between the two communication partner devices 2A and 2B.

For contactless communication over the second communication channel 7, the first communication partner device 2A has first communication means 5A and the second communication partner device 2B has second communication means 5B. The first communication means 5A are designed for contactless communication with the second communication means 5B over the second communication channel 7, wherein, in the event of communication over the second communication channel 7, the making available of the first communication enable information item CEIA, which is necessary to enable communication over the first communication channel 4, is effected in the second communication partner device 2B which prior to communication over the second communication channel 7 does not yet contain the first communication enable information item CEIA. Analogously, the second communication means 5B are designed for contactless communication with the first communication means 5A over the second communication channel 7, wherein, in the event of communication over the second communication channel 7, the making available of the second communication enable information item CEIB, which is necessary to enable communication over the first communication channel 4, is effected in the first communication partner device 2A which prior to communication over the second communication channel does not yet contain the second communication enable information item CEIB. Such communication over the second communication channel 7 is then possible when the two communication means 5A and 5B are located within a second communication range 6. In FIG. 1, the second communication range 6 is indicated by a pictorial representation of its outline with the aid of dashed lines. The communication means 5A and 5B in the present case form what are known as near-field communication means (in brief, NFC means), with the aid of which communication is possible over a distance of a few centimeters over the second communication channel 7, that is to say only within a narrowed second communication range 6.

Figure 4:
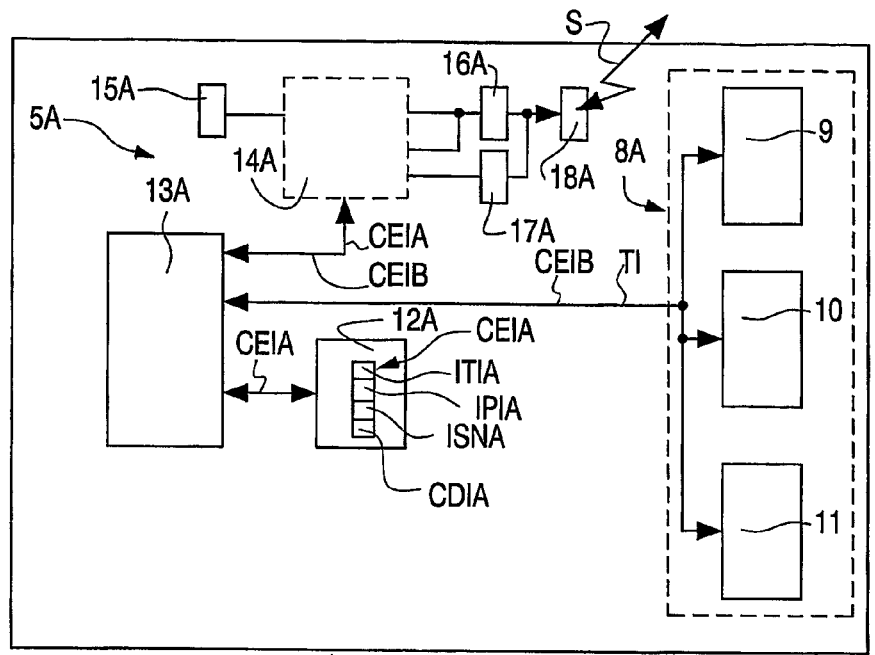
FIG. 4 shows, in a manner analogous to FIG. 1, the first communication partner device shown in FIG. 1.

The first communication partner device 2A, which is shown in detail in FIG. 4, has first interface means 8A which are designed to receive an interface transmission information item TI, that can be fed to them, and the second communication enable information item CEIB. The first interface means 8A are furthermore designed to use the second communication enable information item CEIB for contactless transmission of the interface transmission information item TI to the second communication partner device 2B over the first communication channel 4. For this purpose, the first interface means 8A have a first Bluetooth™ interface 9, an infrared-light interface 10 and what is known as a wireless LAN interface 11.

In correspondence with the respective type of the three interfaces 9, 10 and 11, which type is given in the present case by infrared light, Bluetooth™ and wireless LAN, the first communication enable information item CEIA contains a first interface type information item ITIA, which signifies the type of interface available in the first communication partner device 2A. The first communication enable information item CEIA contains, in addition to the first interface type information item ITIA, an interface preference information item IPIA, which signifies an interface 9, 10 or 11 that is preferred in the first communication partner device 2A, in order to enable communication over the first communication channel using the preferred interface 9, 10 or 11 provided that an interface corresponding to this preferred interface 9, 10 or 11 is also available in the other communication partner device 2B. In this connection, it should be mentioned that the preference for one of the interfaces 9, 10 or 11 may arise as a result of a respective communication load distribution between the interfaces 9, 10 and 11 or as a result of the respective communication error rate occurring, or that has occurred in the past, in the interfaces 9, 10 or 11. The first communication enable information item CEIA further contains a first interface designation information item ISNA, which signifies each interface 9, 10 or 11 available in the first communication partner device 2A and allows an unambiguous designation of the respective interface 9, 10 or 11. The interface designation information item ISNA is in the present case formed by three (3) first interface serial numbers, wherein in each case one of the interface serial numbers is unique for precisely one of the interfaces 9, 10 or 11, so that the other communication partner device 2B can use it to respond unambiguously to the respective interface 9, 10 or 11 in the event of communication over the first communication channel 4. However, it should be mentioned that the first interface designation information item ISNA can also be formed by a logic address or a physical address, which can be used to unambiguously address the respective interface 9, 10 or 11 in the event of communication over the first communication channel 4. The first communication enable information item CEIA further contains a first communication partner designation information item CDIA, which signifies the first communication partner device 2A and allows identification of the communication partner device 2A. The first communication partner device 2A furthermore has first storage means 12A which are provided for storing the first communication enable information item CEIA contained therein.

The first communication partner device 2A furthermore has first communication control means 13A which are designed to control the first interface means 8A, that is to say to control communication over the first communication channel 4. For this purpose, the first communication control means 13A are designed to transmit the interface transmission information item TI that is to be communicated and the second communication enable information item CEIB, which has been made available to them by the first communication means 5A, to the first interface means 8A. The first communication control means 13A furthermore form communication start means, which are designed to interact with the first communication means 5A and are designed to use the communication enable information item CEIB of the other communication partner device 2B, which item has been made available, to start communication with the other communication partner device 2B over the first communication channel 4, as soon as the communication enable information item CEIB has been made available by the first communication means 5A.

The first communication control means 13A are furthermore designed to access, at the request of the first communication means 5A, the first storage means 12A and to read the first communication enable information item CEIA from the first storage means 12A and to transmit the first communication enable information item CEIA to the first communication means 5A.

The first communication partner device 2A is furthermore designed to interact with an electrical circuit 14A associated with the first communication means 5A, which circuit 14A has circuit parts for forming the first communication means 5A.

The first communication means 5A further comprise oscillation generation means 15A, first adaptation means 16A, second adaptation means 17A and transmission means 18A, which means 15A, 16A, 17A and 18A are arranged outside the circuit 14A in the first communication partner device 2A and are provided and designed to interact with the first circuit 14A. The oscillation generation means 15A are formed by a crystal oscillator circuit which is designed to generate and transmit an oscillator signal OS. The first and second adaptation means 16A and 17A are designed to adapt in each case an impedance of the circuit 14A to an impedance of the transmission means 18A. The transmission means 18A are in the present case formed by an antenna, which is not shown in FIG. 5 and with the aid of which a signal occurring at the transmission means 18A in the event of communication over the second communication channel can be transmitted between the circuit 14A and the environment of the transmission means 18A. However, it should be mentioned that the transmission means 18A can also be formed by a communication coil configuration, with the aid of which an inductive coupling can be produced to means of the second communication partner device 2A that correspond thereto.

Figure 6:
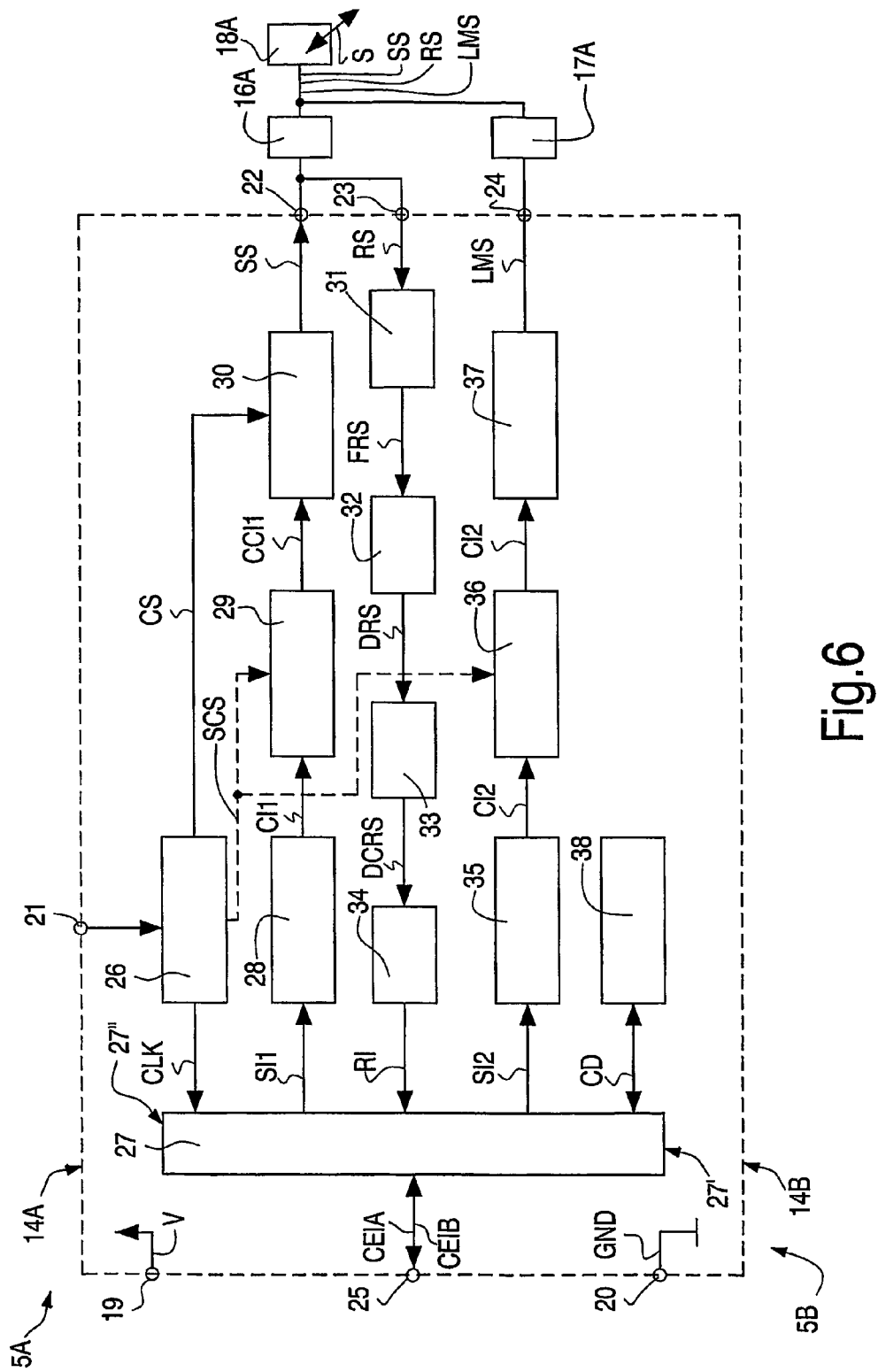
FIG. 6 shows, in a manner analogous to FIG. 1, a circuit contained in both communication partner devices shown in FIG. 1, for forming communication means for the respective communication partner device.

The circuit 14A shown in FIG. 6 has a first terminal 19, a second terminal 20, a third terminal 21, a fourth terminal 22, a fifth terminal 23, a sixth terminal 24 and a seventh terminal 25. By means of the first and second terminals 19 and 20, the circuit 14A can be supplied with a supply voltage V in relation to a reference potential GND, so that the circuit 14A can be supplied with electrical power for its operation. With the aid of the third terminal 21, the circuit 14A can furthermore be fed the oscillator signal OS by the oscillation generation means 15A. At the fourth terminal 22, the circuit 14A can be connected to the first adaptation means 16A, wherein a transmission signal SS that can be actively generated by the circuit 14A can be transmitted to the first adaptation means 16A via the fourth terminal 22, which first adaptation means 16A subsequently transmit the transmission signal SS to the transmission means 18A. The circuit 14A can furthermore be connected to the first adaptation means 16A at its fifth terminal 23, wherein a reception signal RS that can be received by the transmission means 18A can be fed to the fifth terminal 23 of the circuit 14A after it has been led through the first adaptation means 16A as reception signal RS. The circuit 14A can furthermore be connected, at its sixth terminal 24, to the second adaptation means 17A, wherein a load modulation signal LMS that can be generated by the circuit 14A affects, via the sixth terminal 24, the signal S occurring at the transmission means 18A and causes load modulation of the signal S.

The circuit 14A furthermore has an oscillator signal processing stage 26, which is designed to receive the oscillator signal OS and to generate and transmit a clock signal CLK, a carrier signal CS and a subcarrier signal SCS.

The circuit 14A furthermore has a processing control stage 27, which forms sequence control means and which is designed to receive the clock signal CLK and, taking account of the clock signal CLK, to control the processing of information in a clock-synchronous manner and to control the communication of the first communication means 5A over the second communication channel 7. The processing control stage 27 is in this connection designed to generate and transmit a first transmission information item SI1 and a second transmission information item SI2. The processing control stage 27 is furthermore designed to receive and process a reception information item RI. The processing control stage 27 also forms an interrogation stage 27', which is designed to use the first communication control means 13A to interrogate the communication enable information item CEIA stored in the storage means 12A and to receive said communication enable information item CEIA from the first communication control means 13A. Accordingly, the communication means 5A are designed to interact, with the aid of the circuit 14A, with the first communication control means 13A, and to use the first communication control means 13A to interrogate the first communication enable information item CEIA which is stored in the storage means 12A. The first communication enable information item CEIA, which can be interrogated, can be fed to the circuit 14A via the seventh terminal 25.

The processing control stage 27 also forms a provision stage 27" which is designed to provide the second communication enable information item CEIB, which can be received by means of the reception information item RI, for the first communication control means 13A of the first communication partner device 2A. Accordingly, the first communication means 5A are designed to interact, with the aid of the circuit 14A, with the first communication control means 13A, and to provide the received second communication enable information item CEIB for the interface means 8A. The second communication enable information item CEIB that can be provided can be transmitted to the first communication control means 13A via the seventh terminal 25.

The circuit 14A furthermore has a command generation stage 28, which is designed to receive the first transmission information item SI1 and to use the first transmission information item SI1 to generate and transmit a first command information item CI1 that represents the transmission information item SI1. The circuit 14A furthermore has a first encoding stage 29, which is designed to receive the subcarrier signal SCS and to receive the first command information item CI1 and to generate and transmit, in a manner clock-synchronous with the subcarrier signal SCS, a first encoded command information item CCI1 that represents the first command information item CI1. The circuit 14A furthermore has a modulation stage 30, which is designed to receive the carrier signal CS and the first encoded command information item CCI1 and to modulate the carrier signal CS as a function of the first encoded command information item CCI1. The modulation stage 30 is designed, as a result of the modulation of the carrier signal CS, to generate and transmit the transmission signal SS at the fourth terminal 22. The modulation stage 30 is in the present case designed to carry out amplitude modulation of the carrier signal CS, so that, depending on the first encoded command information item CCI1, either the amplitude-modulated carrier signal CS or the unmodulated carrier signal CS can be transmitted by the transmission means 18A as the transmission signal SS. However, it should be mentioned that the modulation stage 30 can also be designed to carry out phase modulation or frequency modulation.

The circuit 14A furthermore has a filter stage 31, which is designed to receive the reception signal RS, to filter the reception signal RS with respect to at least one frequency band, and to transmit a filtered reception signal FRS. The circuit 14A furthermore has a demodulator stage 32, which is designed to receive the filtered reception signal RS, to demodulate the filtered reception signal FRS, and to transmit a demodulated reception signal DRS that represents the filtered reception signal FRS. The circuit 14A furthermore has a decoding stage 33, which is designed to receive and decode the demodulated reception signal DRS and to transmit a decoded reception signal DCRS that represents the demodulated reception signal DRS. The circuit 14A furthermore has a reception information item recognition stage 34, which is designed to receive the decoded reception signal DCRS, to recognize a reception information item RI contained in the decoded reception signal DCRS, and to transmit this recognized reception information item RI to the processing control stage 27.

The circuit 14A furthermore has a response command generation stage 35, which is designed to receive the second transmission information item SI2 and to generate and transmit a second command information item CI2 that represents the second transmission information item SI2. The circuit 14A furthermore has a second encoding stage 36, which is designed to receive the subcarrier signal SCS and the second command information item CI2 and to generate and transmit, in a manner clock-synchronous with the subcarrier signal SCS, a second encoded information item CCI2 that represents the second command information item CI2. The circuit 14A furthermore has a load modulation stage 37, which is designed to receive the second encoded command information item CCI2 and to use the externally generated, unmodulated carrier signal, which is occurring at the transmission means 18 and in this case forms the signal S, to generate the load modulation signal LMS.

The circuit 14A furthermore has a processing data storage stage 38, which is provided for the storage of processing data PD that arises in the processing of information items, such as, for example, the information items CEIA, CEIB, SI1, RI or SI2.

The electrical circuit 14A is in the present case formed by an integrated circuit, wherein the terminals 19 to 25 are fixedly connected to counterterminals of the first communication partner device 2A which correspond to the terminals 19 to 25, said counterterminals not being shown in FIG. 4. In this connection, however, it should be mentioned that the circuit 14A can also form part of a data carrier which can be inserted in and removed from the first communication partner device 2A. In such a case, the terminals 19 to 25 are formed by plug-in connection means or by two-dimensional contacting means which are designed to interact with countercontacting means of the first communication partner device 2A that are complementary thereto.

Using the circuit 14A and the means 15A, 16A, 17A and 18A, the first communication means 5A are designed to communicate in accordance with the ECMA/TC32-TG19/2002/13 standard, which will be referred to in brief hereinbelow as the ECMA standard. In this case, an active transmission path is formed by the stages 27, 28, 29 and 30 and a passive transmission path is formed by the stages 27, 35, 36 and 37, over which two transmission paths the first communication enable information item CEIA can be communicated to the second communication means 5B. For both transmission paths, the stages 31, 32, 33, 34 and 27 form a common reception path, over which the second communication enable information item CEIB can be received by the second communication means 5B. Consequently, an active communication mode in accordance with the ECMA standard can be formed by the active transmission path and the common reception path. Furthermore, a passive communication mode in accordance with the ECMA standard can be formed by the passive transmission path and the common reception path The communication means 5A are furthermore designed to make available the two communication enable information items CEIA and CEIB directly after the start of communication over the second communication channel. For this purpose, the first communication means 5A are furthermore designed to make available the respective communication enable information item CEIA or CEIB in the in each case other communication partner device 2A or 2B by using two activation commands—namely a first activation command designated "attribute request" and a second activation command designated "attribute response". The two activation commands can be communicated between the two communication partner devices 2A and 2B in accordance with the communication protocol of the ECMA standard as first commands over the second communication channel 7, and are provided for activating communication, in compliance with the communication protocol, in accordance with the ECMA standard. In the present case, it is provided that the first communication partner device 2A is designed to start communication over the second communication channel 7, and accordingly to transmit the first activation command to the second communication partner device 2B.

Figure 2:
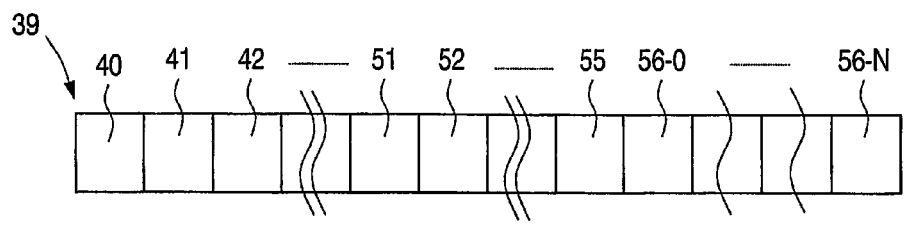
FIG. 2 shows symbolically a first activation command of a communication protocol used in the communication partner devices.

The first activation command 39 which is illustrated in detail in FIG. 2 has the hexadecimal value "D4" as a first byte and the hexadecimal value "00" as a second byte, and this is in compliance with the ECMA standard. The first activation command 39 moreover has ten bytes 42 to 51, which in accordance with the ECMA standard are provided for a random number but unlike the ECMA standard are not for this random number but rather are for the first interface designation information item ISNA of the interface 9, 10 or 11 that is preferred for communication over the first communication channel, that is to say specifically the interface serial number that belongs to the preferred interface 9, 10 or 11. A further four bytes 52 to 55 of the first activation command 39 are occupied in accordance with the ECMA standard. The first activation command 39 moreover has general bytes 56-0 to 56-N provided in accordance with the ECMA standard, the interface type information item ITIA, the interface preference information item IPIA, the remaining two interface serial numbers of the interfaces 9 and 10 or 9 and 11 or 10 and 11 that are not preferred, and additionally the communication partner designation information item CDIA.

Figure 5:
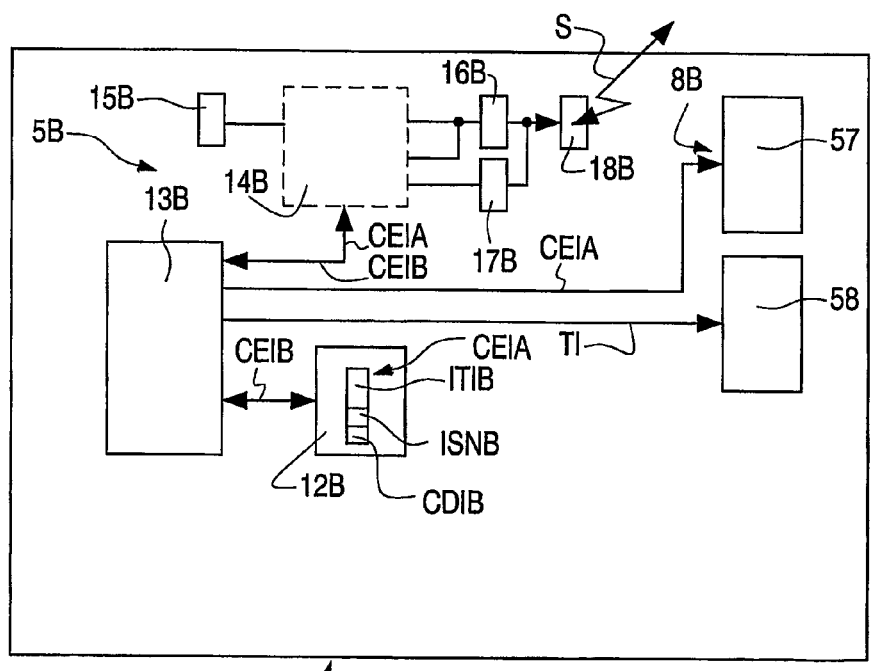
FIG. 5 shows, in a manner analogous to FIG. 1, the second communication partner device shown in FIG. 1.

The second communication partner device 2B shown in detail in FIG. 5 for its part has, analogously to the first communication partner device 2A shown in FIG. 4, second interface means 8B which are designed and provided in correspondence with the first interface means 8A of the first communication partner device 2A for communication over the first communication channel 4, and which in the present case are formed by a second Bluetooth™ interface 57.

The second communication partner device 2B furthermore has second storage means 12B, which are provided for the same purpose as the first storage means 12A, namely for the storage of the second communication enable information item CEIB. In the present case, in addition to a unique interface serial number which forms the second interface designation information item ISNB, there are also provided a second interface type information item ITIB and a second communication partner designation information item CDIB. An interface preference information item that corresponds to the first interface preference information item IPIA is not provided since there is only a single interface, namely the Bluetooth™ interface 57. However, it should be mentioned that, when there are a number of interfaces in the second communication partner device 2B, the second communication enable information item CEIB may also contain all details provided in the first communication enable information item CEIA.

The second communication partner device 2B furthermore has second communication control means 13B which, analogously to the first communication control means 13A of the first communication partner device 2B, are designed to control the second interface means 13B or to control communication over the first communication channel 4. Furthermore, the second communication control means 13B are designed to transmit the interface transmission information item TI, received by the interface means 8B, to a printer stage 56. The printer stage 56 is designed to print onto paper at least a printable part of the interface transmission information item TI.

The second communication partner device 2B furthermore has means 15B, 16B, 17B and 18B which are associated with the second communication means 5B and are functionally identical to the means 15A, 16A, 17A and 18A provided in the first communication partner device 2A.

The second communication partner device 2B furthermore has a second circuit 14B associated with the second communication means 5B, which circuit is identical, in terms of its design and function, to the first circuit 14A shown in FIG. 6.

Figure 3:
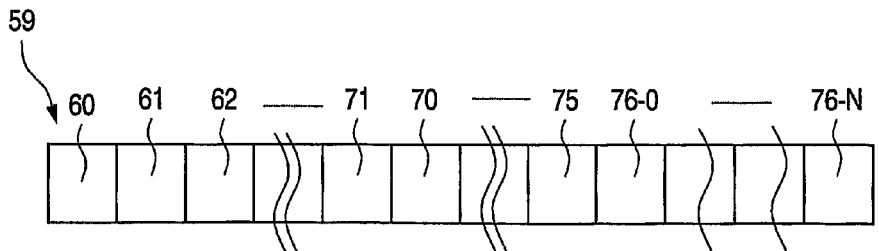
FIG. 3 shows, in a manner analogous to FIG. 2, a second activation command of the communication protocol used in the communication partner devices.

Using the communication protocol of the ECMA standard, in the present case it is provided that the second communication partner device 2B is designed to receive the first activation command 39 and, as a response to the first activation command 39, to transmit the second activation command 59 shown in detail in FIG. 3.

The second activation command 59 has the hexadecimal value "D5" as a first byte 60 and the hexadecimal value "01" as a second byte 61, and this is in compliance with the ECMA standard. The second activation command 59 moreover has ten bytes 62 to 71, which in accordance with the ECMA standard are provided for a random number but unlike the ECMA standard are not for this random number but rather are for the second interface designation information item ISNB of the interface that is preferred for communication over the first communication channel 4, that is to say in the present case the unique interface serial number, contained in the second communication partner device 2B, of the second Bluetooth™ interface 57. A further five bytes 70 to 75 are reserved in accordance with the ECMA standard. The second activation command 59 moreover has general bytes 76-0 to 76-N provided in accordance with the ECMA standard, the second interface type information item ITIB and the communication partner designation information item CDIB.

Hereinafter, the mode of operation of the two communication partner devices 2A and 2B is explained using an example of an embodiment of the one communication partner device 2A shown in FIG. 4 and of the other communication partner device 2B shown in FIG. 5. It is assumed that the communication partner device 2A is a laptop 2A and that the communication partner device 2B is a printer 2B. The communication control means 13A of the laptop 2A are formed by the hardware of the laptop 2A and by a software application—in the present case text processing software—that interacts with the hardware. The communication control means 13B of the printer 2B are formed by the hardware of the printer 2B and by what is known as firmware that interacts with the hardware.

In accordance with the application example, on entering an office, the laptop 2A is initially positioned in the direct vicinity of the printer 2B by a user who subsequently would like to print out a text document from the laptop 2A, using the printer 2B, over the first communication channel 4, wherein the user ensures that both the first communication means 5A and the second communication means 5B are arranged within the second communication range 6, as shown in FIG. 1. In this position, a communication enabling method for enabling contactless communication over the first communication channel 4 between the one (laptop 2A), that is to say the first, communication partner device 2A, which belongs to the communication system 1 having two such communication partner devices 2A and 2B, and the other (printer 2B), that is to say the second, communication partner device 2B of the communication system 1 is started, wherein both communication partner devices 2A and 2B contain a communication enable information item CEIA and CEIB, respectively, and wherein the communication enable information item CEIA or CEIB is used to enable bidirectional communication between the one communication partner device 2A and the other communication partner device 2B over the first communication channel 4. In accordance with the method, the one communication partner device 2A effects contactless communication over the second communication channel 7 using the communication means 5A and the other communication partner device 2B effects contactless communication over the second communication channel 7 using the communication means 5B. In the event of such communication over the second communication channel 7, the first communication enable information item CEIA, which is necessary to enable communication over the first communication channel 4, is made available in the other communication partner device 2B which prior to communication over the second communication channel 7 does not yet contain the first communication enable information item CEIA.

In accordance with the method, firstly in the laptop 2A the first storage means 12A use the interrogation stage 27' contained in the circuit 14A to interrogate the first communication enable information item CEIA that is stored in the first storage means 12A, and said first communication enable information item CEIA is transmitted by the first communication means 5A to the second communication means 5B of the printer 2B over the second communication channel 7, wherein the first communication enable information item CEIA contains the first interface type information item ITIA, the interface preference information item IPIA, the first interface designation information item ISNA and the first communication partner designation information item CDIA. In accordance with the method, it is provided that the first communication enable information item CEIA is made available directly after the start of communication over the second communication channel 7. For this purpose, the circuit 5A provides the communication protocol in accordance with the ECMA standard for communication over the second communication channel 7 and, in the event of communication over the second communication channel 7 in accordance with this communication protocol, communication is effected in the active communication mode. In the first circuit 5A, the first communication enable information item CEIA received via the seventh terminal 25 is transmitted by the processing control stage 27 as transmission information item SI1 to the command generation stage 28. Subsequently, the first activation command 39 shown in FIG. 2 is generated by the command generation stage 28, transmitted in the form of the first command information item CI1 to the first encoding stage 29, and then transmitted from the first encoding stage 29 in the form of the first encoded command information item CCI1 to the modulation stage 30. Accordingly, the first communication enable information item CEIA is communicated from the laptop 2A to the printer 2B using the first activation command 39 of the communication protocol.

In the second communication partner device 2B, the communication enabling method is likewise started as a result of receiving the transmission signal SS. Again in the second communication partner device 2B the second circuit 14B provides the communication protocol in accordance with the ECMA standard for communication over the second communication channel 7, wherein, however, in the present case, in the event of communication over the second communication channel 7 in accordance with this communication protocol, communication is effected in the passive communication mode, since the actively generated transmission signal SS has already been provided by the first communication means 5A.

In the second communication partner device 2B, the first communication enable information item CEIA is firstly received by the second communication means 5B over the second communication channel 7, wherein the common reception path of the circuit 14B is used. The first communication enable information item CEIA is provided by the provision stage 27" to enable communication over the first communication channel 4, and is taken into account by the second communication control means 13B such that only the first interface serial number of the first Bluetooth™ interface 9 is transmitted to the second interface means 8B, because all other details relating to the first communication partner device 2A are redundant since only the second Bluetooth™ interface 57 is available in the second communication partner device 2B.

Subsequently, in accordance with the method, in the event of communication over the second communication channel 7, the second communication enable information item CEIB that is necessary to enable communication over the first communication channel 4 is made available in the other communication partner device 2A which prior to communication over the second communication channel 7 does not contain the second communication enable information item CEIB, wherein the second communication enable information item CEIB contains the second interface type information item ITIB, the second interface designation information item ISNB and the second communication partner designation information item CDIB.

For this purpose, the second storage means 12B firstly use the interrogation stage 27' contained in the circuit 14B to interrogate the second communication enable information item CEIB that is stored in the second storage means 12B, and said second communication enable information item CEIB is transmitted by the second communication means 5B to the first communication means 5A of the laptop 2A over the second communication channel 7. Analogously to the laptop 2A, in the printer 2B it is also provided, in accordance with the method, that the second communication enable information item CEIB is made available directly after the start of communication over the second communication channel 7. Since, however, the first activation command 39 has already been communicated by the first communication means 5A, in the circuit 14B the second communication enable information item CEIB received via the seventh terminal 25 is transmitted by the processing stage 27 to the response command generation stage 35 as the second transmission information item SI2. Subsequently, the second activation command 59 shown in FIG. 3 is generated by the response command generation stage 35 and transmitted in the form of the second command information item CI2 to the second encoding stage 36, and then from the second encoding stage 36 in the form of the second encoded command data CCI2 to the load modulation stage 37. Accordingly, the second communication enable information item CEIB is communicated from the printer 2B to the laptop 2A using the second activation command 59.

In the first communication partner device 2A, the second communication enable information item CEIB is then received by the first communication means 5A over the second communication channel 7, wherein the common reception path of the circuit 14A is used. The second communication enable information item CEIB is provided by the provision stage 27" to enable communication over the first communication channel 4, and is taken into account by the first communication control means 13A, using the second interface type information item ITIB, such that the second interface serial number is transmitted to the first Bluetooth™ interface 9, because only the second Bluetooth™ interface 57 is available in the second communication partner device 2B for communication over the first communication channel 4.

Thereafter, the communication enabling method is terminated in both communication partner devices 2A and 2B, because communication over the first communication channel 4 within the first communication range 3, which is substantially larger that the second communication range, is enabled without the user having to do anything more.

Immediately after the communication enable information items CEIA and CEIB have been made available, communication of what is known as a "dummy information item" between the two communication partner devices 2A and 2B over the first communication channel 4, which dummy information item does not represent any information that can actually be used, is started in the respective other communication partner device 2A or 2B by the respective communication start means, which in the first communication partner device 2A are formed by the first communication control means 13A and in the second communication partner device 2B are formed by the second communication control means 13B, using the communication enable information item CEIA or CEIB, in order permanently to reserve the first communication channel 4 for communication between these two communication partner devices 2A and 2B.

Subsequently, at a point in time desired by the user, by controlling the software application running on the laptop 2A, the interface transmission information item TI, which in the present case represents the text document, is communicated, using the second interface serial number, from the first Bluetooth™ interface 9 of the laptop 2A to the second Bluetooth™ interface 57 of the printer 2B. Thereafter, up until the end of printing 2B, the first interface serial number is used for communication of a printing status information item from the second Bluetooth™ interface 57 of the printer 2B to the first Bluetooth™ interface 9 of the laptop 2A, in order to make available to the user of the laptop 2A the progress of the operation of printing onto paper in the software application running on the laptop 2A.

It should be mentioned that the second communication partner device 2B can also be formed by a laptop or another dominant item of equipment, so that communication over the second communication channel 7 can also be started by the second communication partner device 2B. In this connection, it should also be mentioned that the two communication partner devices 2A and 2B can also each be formed by a mobile telephone or by what is known as a "Personal Digital Assistant".

Although mention has been made above only of interface means 8A and 8B which are designed for contactless communication over the first communication channel 4, it should be mentioned that interface means designed for communication requiring contact may also be provided. In such a case, the advantages of the invention in connection with the above-described contactless communication over the second communication channel 7 are also obtained.

It should be mentioned that, in addition to the single second communication partner device 2B as described above, other communication partner devices 2B', 2B" and 2B'" may also be provided, as illustrated in FIG. 1. In this case, the communication partner devices 2B', 2B" and 2B'" may also be equipped with Bluetooth™ interfaces, which are provided for communication over in each case one further first communication channel 4', 4" and 4'". By providing the measures according to the invention, in the present case the advantage is also obtained that the communication partner device 2B can be unambiguously selected from among the multiplicity of communication partner devices 2B, 2B', 2B" and 2B'" designed for communication over the respective first communication channel 4, 4', 4" and 4'" in accordance with the Bluetooth™ standard, and this is particularly advantageous when the four communication partner devices 2B, 2B', 2B" and 2B'" support identical functionalities.

By contrast to what has been stated in the preceding paragraph, it may also be provided that for example the communication partner device 2B" has a functionality which differs from the other communication partner devices 2B, 2B' and 2B'". Such a case occurs for example when the communication partner device 2B is formed by a printer and the communication partner device 2B" is formed by a scanner. Even in this case, the two communication partner devices 2B and 2B" can be selected, by means of communication, preceding the communication over the first communication channel 4 or 4", between the one communication partner device 2A and the other communication partner device 2B or between the one communication partner device 2A and the other communication partner device 2B" over the respective second communication channel 7 or 7" and by an exchange of the respective communication enable information item taking place in the process, from among the multiplicity of communication partner devices 2B, 2B', 2B" and 2B'" for communication between the communication partner devices 2A and 2B or 2A and 2B" over the first communication channel 4 or 4", which communication is enabled by the communication enable information item CEIA or CEIB or CEIB" contained in the respective communication partner device 2A, 2B and 2B".

Furthermore, it may also be provided that the communication with the communication partner device 2B" may be effected using a standard that differs from the Bluetooth™ standard.

It should also be mentioned that the communication over the second communication channel 7 may be effected in a manner that differs from the ECMA standard.

It should also be mentioned that it may also be provided that, in the event of communication over the second communication channel 7, a communication enable information item is communicated over the second communication channel 7 only with the first activation command 39 or only with the second activation command 59. This may be advantageous, for example, in the event of unidirectional communication over the first communication channel 4. In this connection, it may also be advantageous that, once the communication enable information item contained in the one communication partner device has been made available in the other communication partner device in the course of communication over the second communication channel 7, the communication enable information item contained in the other communication partner device is made available to the one communication partner device during communication over the first communication channel 4, using the communication enable information item that has already been made available. In the present case, too, the advantage is obtained that there is no need for any lengthy connection setup over the first communication channel 4, because the one communication partner device can be responded to directly over the first communication channel 4.

It may also be mentioned that the interface type information item ITIA or ITIB, the interface designation information item ISNA or ISNB, the interface preference information item IPIA and the communication partner designation information item CDIA or CDIB may also be provided at positions in the first activation command 39 or the second activation command 59 other than those positions mentioned in connection with the respective activation command 39 or 59.

The invention claimed is:

1. A communication partner device which belongs to a communication system having at least two such communication partner devices and which is designed to communicate with another communication partner device of the communication system over a first communication channel, wherein one of the two communication partner devices contains a communication enable information item which is used to enable communication between the one communication partner device and the other communication partner device over the first communication channel, and which is designed to interact with an electrical circuit, which circuit has circuit parts for forming communication means which are designed for contactless communication with communication means of the other communication partner device over a second communication channel and which, in the event of communication over the second communication channel, are designed to make available the communication enable information item, necessary for enabling communication over the first communication channel, in the communication partner device which prior to communication over the second communication channel does not yet contain the communication enable information item, wherein the electrical circuit includes a plurality of interfaces configured for communication over the first communication channel, the interfaces including a Bluetooth interface, an infra-red light interface, and a wireless large area network interface for communication over the first communication channel, the electrical circuit further including a transmission device configured for transmission of carrier signals over the second communication channel, wherein the communication means are designed, in the event of communication over the second communication channel, to communicate in accordance with a communication protocol, and wherein the communication means are designed to make available the communication enable information item by using at least one of two activation commands of the communication protocol, which activation commands can be communicated between the two communication partner devices in accordance with the communication protocol as first commands over the second communication channel and are provided in order to activate communication in compliance with the communication protocol.

2. A communication partner device as claimed in claim 1, wherein the communication means are designed to make available the communication enable information item directly after the start of communication over the second communication channel.

3. A communication partner device as claimed in claim 1, wherein the communication means are designed to receive the communication enable information item, contained in the other communication partner device, over the second communication channel, and wherein the circuit has a provision stage which is designed to provide the communication enable information item, received by the communication means, for enabling communication over the first communication channel.

4. A communication partner device as claimed in claim 1, wherein communication start means are provided which are designed to interact with the communication means and are designed to use the communication enable information item of the other communication partner device, which can be made available, to start communication with the other communication partner device over the first communication channel as soon as the communication enable information item has been made available by the communication means.

5. A communication partner device as claimed in claim 1, wherein the communication partner device has storage means which are provided for storing the communication enable information item contained therein, and wherein the circuit has an interrogation stage which is designed to interrogate the communication enable information item stored in the storage means, and wherein the communication means are designed to transmit the communication enable information item, which can be interrogated, to the communication means of the other communication partner device over the second communication channel.

6. A communication partner device as claimed in claim 1, wherein the communication enable information item contains an interface type information item which indicates the interfaces that are available in the communication partner device for communication over the first communication channel.

7. A communication partner device as claimed in claim 6, wherein the communication enable information item contains, in addition to the interface type information item, an interface preference information item which signifies one of the interfaces that is preferred in the communication partner device containing the communication enable information item.

8. A communication partner device as claimed in claim 1, wherein the communication enable information item contains an interface designation information item which signifies an interface that is available in the communication partner device containing the communication enable information item, which interface is designed for communication over the first communication channel.

9. A communication partner device as claimed in claim 1, wherein the communication enable information item contains a communication partner designation information item which signifies the communication partner device that contains the communication enable information item.

10. A circuit for a communication partner device, which communication partner device belongs to a communication system having at least two such communication partner devices and is designed to communicate with another communication partner device the communication system over a first communication channel, wherein one of the two communication partner devices contains a communication enable information item which is used to enable communication between the one communication partner device and the other communication partner device over the first communication channel, which circuit has circuit parts for forming communication means which are designed for contactless communication with communication means of the other communication partner device over a second communication channel and which, in the event of communication over the second communication channel, are designed to make available the communication enable information item, necessary for enabling communication over the first communication channel, in the communication partner device which prior to communication over the second communication channel does not yet contain the communication enable information item, wherein the circuit includes a plurality of interfaces configured for communication over the first communication channel, the interfaces including a~of a Bluetooth interface, an infra-red light interface, and a wireless large area network interface for communication over the first communication channel, the circuit further including a transmission device configured for transmission of carrier signals over the second communication channel, wherein the communication means are designed, in the event of communication over the second communication channel, to communicate in accordance with a communication protocol, and wherein the communication means are designed to make available the communication enable information item by using at least one of two activation commands of the communication protocol, which activation commands can be communicated between the two communication partner devices in accordance with the communication protocol as first commands over the second communication channel and are provided in order to activate communication in compliance with the communication protocol.

11. A circuit as claimed in claim 10, wherein the communication means are designed to make available the communication enable information item directly after the start of communication over the second communication channel.

12. A circuit as claimed in claim 10,
wherein the communication means are designed to receive the communication enable information item, contained in the other communication partner device, over the second communication channel, and
wherein the circuit has a provision stage which is designed to provide the communication enable information item, received by the communication means, for enabling communication over the first communication channel.

13. A circuit as claimed in claim 10,
wherein the circuit has an interrogation stage which is designed to interrogate the communication enable information item contained in the communication partner, and
wherein the communication means are designed to transmit the communication enable information item, which can be interrogated, to the communication means of the other communication partner device over the second communication channel.

14. A circuit as claimed in claim 10, wherein the communication enable information item contains an interface type information item which indicates the interfaces that are available in the communication partner device for communication over the first communication channel.

15. A circuit as claimed in claim 14, wherein the communication enable information item contains, in addition to the interface type information item, an interface preference information item which signifies one of the interfaces that is preferred in the communication partner device containing the communication enable information item.

16. A circuit as claimed in claim 10, wherein the communication enable information item contains an interface designation information item which signifies an interface that is available in the communication partner device containing the communication enable information item, which interface is designed for communication over the first communication channel.

17. A circuit as claimed in claim 10, wherein the communication enable information item contains a communication partner designation information item which signifies the communication partner device that contains the communication enable information item.

18. A communication enabling method for enabling communication over a first communication channel between a communication partner device which belongs to a communication system having at least two such communication partner devices, and another communication partner device of the communication system, wherein one of the two communication partner devices contains a communication enable information item and
wherein the communication enable information item is used to enable communication between the one communication partner device and the other communication partner device over the first communication channel using one of a plurality of interfaces of the one communication partner device configured for communication over the first communication channel, the interfaces including of a Bluetooth interface, an infra-red light interface, and a wireless large area network interface for communication over the first communication channel, and
wherein contactless communication is effected over a second communication channel using communication means of the one communication partner device and using communication means of the other communication partner device, each of the one communication partner device and the other communication partner device including a transmission device configured for transmission of carrier signals over the second communication channel, and
wherein, in the event of such communication over the second communication channel, the communication enable information item, necessary for enabling communication over the first communication channel, is made available in the communication partner device which prior to communication over the second communication channel does not yet contain the communication enable information item,
wherein, in the event of communication over the second communication channel, communication is effected in accordance with a communication protocol, and
wherein the communication enable information item, is communicated between the two communication partner devices in accordance with the communication protocol over the second communication channel by using at least one of two activation commands of the communication protocol, which activation commands are transmitted as first commands of the communication protocol in order to activate communication in compliance with the communication protocol.

19. A method as claimed in claim 18, wherein the communication enable information item is made available directly after the start of communication over the second communication channel.

20. A method as claimed in claim 18,
wherein, with the aid of the communication means, the communication enable information item is received over the second communication channel and
wherein, with the aid of a provision stage which is designed to provide the communication enable information item received by the communication means, the communication enable information item for enabling communication over the first communication channel is provided.

21. A method as claimed in claim 18, wherein, with the aid of communication start means which are designed to interact with the communication means and are designed to use the communication enable information item of the other communication partner device, which has been provided, to staff communication with the other communication partner device over the first communication channel, communication with the other communication partner device over the first communication channel using the communication enable information item which has been made available is started as soon as the communication enable information item has been made available by the communication means.

22. A method as claimed in claim 18,
wherein, with the aid of an interrogation stage which is designed to interrogate the communication enable information item stored in storage means of the one communication partner device, the stored communication enable information item is interrogated by the storage means and wherein, with the aid of the communication means, the communication enable information item, which has been interrogated by the storage means, is transmitted to the communication means of the other communication partner device over the second communication channel.

23. A method as claimed in claim 18, wherein the communication enable information item contains an interface type information item which indicates the interfaces that are available in the one communication partner device for communication over the first communication channel.

24. A method as claimed in claim 23, wherein the communication enable information item contains, in addition to the interface type information item, an interface preference information item which signifies one of the interfaces that is preferred in the communication partner device containing the communication enable information item.

25. A method as claimed in claim 18, wherein the communication enable information item contains an interface designation information item which signifies an interface that is available in the communication partner device containing the communication enable information item, which interface is designed for communication over the first communication channel.

26. A method as claimed in claim 18, wherein the communication enable information item contains a communication partner designation information item which signifies the communication partner device that contains the communication enable information item.

* * * * *